McClintock & Cumberland,
Bale Tie.
No. 115,225.    Patented May 23, 1871.
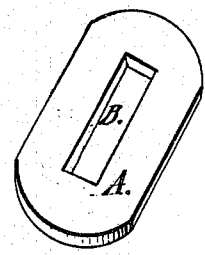
Witnesses:
Rufus R. Rhodes
H. N. Jenkins
Inventor:
James R. McClintock
for myself and as the
Legal Representative of
John Cumberland, deceased

UNITED STATES PATENT OFFICE.

JAMES R. McCLINTOCK, OF NEW ORLEANS, LOUISIANA, FOR HIMSELF AND AS THE LEGAL REPRESENTATIVE OF JOHN CUMBERLAND, DECEASED, ASSIGNEE OF HIMSELF AND SAID CUMBERLAND.

IMPROVEMENT IN COTTON-BALE TIES.

Specification forming part of Letters Patent No. 115,225, dated May 23, 1871.

*To all whom it may concern:*

Be it known that I, JAMES R. McCLINTOCK, of the city of New Orleans, parish of Orleans and State of Louisiana, have invented jointly with JOHN CUMBERLAND, deceased, whose legal representative I am, a certain new, useful, and Improved Tie to be used for fastening together the ends of metallic bands or hoops around bales of cotton; and I do hereby declare the following to be a full, clear, and exact description of the same, reference being had to the annexed drawing, making a part of this specification, whereon it is clearly shown by a view in perspective.

Before I proceed to indicate the nature of my invention or describe its mechanical construction and distinctive characteristics, it is proper to state that in substituting metallic bands for rope on bales of cotton the greatest difficulty to be overcome is the making a secure tie or connection of the ends of the bands after they are put around the bale. It was thought at first that to effect this object it would be sufficient to cut the ends of the bands in such a manner that they would interlock the one end into the other, and hence a variety of modes of cutting and forming the two ends of such bands, so as to adjust and lock them together, have been devised and tried; but in every instance it has been found that the bands were so weakened by the cutting that they could not withstand the strain to which they were subjected by the energy of the expansive force resulting from the elastic properties of the cotton within the bale, especially if, by accident, the bale received any sudden shock or concussion. Thus it fell out that Cleveland's method of fastening the ends of metallic bands together, for which he applied for a patent in 1846, and those of others who followed after him, with different arrangements acting on the same principle, were demonstrated to be useless for all practical purposes; and it consequently became apparent that it would be necessary to employ a supplemental part in the nature of a buckle to secure a tie of the two ends together, and that this buckle should be of such construction as not to require any cutting of the bands, and that it should be susceptible of being so applied in practice as to bring into use the powerful agency of the expansive pressure from the cotton within the bale as a co-operative means to secure firmly the tie or lock of the ends together, which the supplemental device in part established.

The invention of myself and JOHN CUMBERLAND, deceased, of whom, as before stated, I am the legal representative, is a device of this kind, and its nature is of the simplest possible description; for it consists of a buckle of wrought-iron, that is stamped or cut from plates of proper thickness by a single operation of a suitable tool or die, and which is provided with a central opening or slot to receive the two ends of a band and secure them together by the aid of the expansive force of the cotton within the bale. But the invention will be better understood by referring to the drawing, on which it is delineated in what is deemed the simplest and best form in which it can be made.

As delineated, it has an oblong external configuration, with rounded ends, and an oblong central slot just wide and long enough to permit of the easy introduction of the two ends of a band. The rounded ends, presenting a more symmetrical and handsome formation than any other, while, at the same time, they are less liable to catch against other objects in the handling of the bale or the transportation of it from place to place, are deemed preferable to any others; but obviously the buckle might be made oblong or square, and with uncut corners, or of any other convenient external formation, without at all affecting its mode of operation. So, also, the central opening, marked B on the drawing, might be proportionately wider than as shown on the drawing without at all interfering with its capacity to fulfill the object designed to be subserved by it. In fact, the invention is the same, whatever external configuration it may have, and whatever the form of the slot, provided, only, its configuration involve no difficulty in its production, and there be only one central slot to receive the ends of the band of hoop-iron.

In applying the device to use, a variety of modes of attaching the ends of the bands to it may be adopted—as, for example, among others, the mode described in our application of September 22, 1858; but the best and simplest mode is to bend the ends of the bands downwardly into the form of two oblate hooks, so that when the bale is withdrawn from the compressing-machine the expansive force developed by the elasticity of the cotton within it will act upon the points of the same, and push them up against the band, and thus effectually secure the fastening.

Having thus described the invention, what I claim as the joint invention of JOHN CUMBERLAND and myself, and desire to secure by Letters Patent for the joint use of myself and his heirs, is—

The buckle A, provided with a single central opening or slot, B, when the same is used for fastening the ends of metallic bands together around cotton-bales, in the manner substantially as herein described.

JAMES R. McCLINTOCK.

Witnesses:
RUFUS R. RHODES,
J. G. EUSTIS.